INVENTOR.
H. B. IRVIN
BY Young + Quigg
ATTORNEYS

May 10, 1966  H. B. IRVIN  3,250,312
METHOD OF AND APPARATUS FOR EVAPORATION PROCESS CONTROL
Filed Jan. 25, 1962  2 Sheets-Sheet 2

INVENTOR.
H. B. IRVIN
BY Young & Quigg
ATTORNEYS

United States Patent Office 3,250,312
Patented May 10, 1966

3,250,312
METHOD OF AND APPARATUS FOR
EVAPORATION PROCESS CONTROL
Howard B. Irvin, Bartlesville, Okla., assignor to Phillips Petroleum Company, a corporation of Delaware
Filed Jan. 25, 1962, Ser. No. 168,706
10 Claims. (Cl. 159—44)

This invention relates to a method of and apparatus for controlling a process. In a specific aspect, this invention relates to an improved method of and apparatus for controlling a separation process wherein a process variable is manipulated in response to a determination representative of a second process variable required value and in response to a measurement representative of said second process variable. In another specific aspect, this invention relates to an improved method of and apparatus for the separation of a rubber polymer from a diluent solution of said rubbery polymer.

There is a continuous effort in the chemical industry to develop more and highly refined methods of process control. The control of continuous separation processes is particularly important and difficult in those separation processes wherein a first fluid containing the constituent of interest is passed to a separation zone; a second fluid is passed to said separation zone; and said second fluid is withdrawn from said separation zone containing said constituent of interest and having a controlled composition. A typical example of such a separation process wherein control is highly important is in the separation of a rubbery polymer from a diluent solution of said rubbery polymer. A conventional method of separation comprises contacting the solution of rubber in a separation zone with steam, withdrawing an overhead diluent and water vapor stream from said separation zone, and withdrawing from said separation zone a slurry of the rubber and water. It is desirous to produce a slurry free of diluent and having a controlled concentration of rubber and water.

According to my invention, an improved method of and apparatus for controlling a separation process is provided wherein a first fluid containing a constituent of interest is passed to a separation zone; a second fluid is passed to said separation zone; a third fluid is passed to said separation zone; a fourth fluid is withdrawn from said separation zone; and said second fluid is withdrawn from said separation zone containing said constituent of interest. The method of control comprises determining the rate of withdrawal of said withdrawn second fluid stream required and manipulating a process variable responsive to said determination and responsive to a measurement representative of the rate of flow of said second withdrawn fluid.

Accordingly, an object of my invention is to provide a method of and apparatus for controlling a separation process.

Another object of my invention is to provide an improved method of and apparatus for controlling a separation process wherein a process variable is manipulated in response to a determination representative of a second process variable requirement and in response to a measurement representative of said second process variable.

Another object of my invention is to provide an improved method of and apparatus for separating a polymerized rubber from a diluent solution containing said polymerized rubber.

Other objects, advantages, and features of my invention will be readily apparent to those skilled in the art from the following description and the appended claims.

The inventive method of control and apparatus therefor will hereinafter be described as applied to the specific separation of rubber from a diluent solution of rubber. It is not intended to limit the invention thereto as the principles disclosed herein can be readily adapted by those skilled in the art to control other processes of like nature.

The term "rubbery polymer" as hereinafter employed, can comprise a polymerized conjugated diene containing from 4 to 8, inclusive, carbon atoms per molecule. Examples of conjugated dienes which can be employed include 1,3-butadiene, 2-methyl-1,3-butadiene (isoprene), 2,3 - dimethyl - 1,3 - butadiene, 2-methyl-1,3-pentadiene, chloroprene, 2,3-dimethyl-1,3-pentadiene, 2-methyl-3-ethyl-1,3-pentadiene, 2-methoxybutadiene, 2-phenylbutadiene, and the like. The above conjugated dienes can be polymerized either alone or in admixture with each other and/or with one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, 1-octene. Branched chain olefins, such as isobutylene, can be employed as well as 1,1-dialkyl-substituted and 1,2-dialkyl-substituted ethylene such as butene-2, pentene-2, hexene-2, heptene-2, 2-methylbutene-1, 2-methylhexene-1, 2-ethylheptene-1, and the like. Other olefins which can be employed include di-and polyolefins, such as 1,5-hexadiene, 1,4-pentadiene, and 1,4,7-octatriene, and cyclic olefins, such as cyclohexene. Other examples of compounds containing an active $CH_2=C<$ group which are copolymerizable with one or more of the conjugated dienes are styrene, divinylbenzene, 3-vinyltoluene, 1-vinylnaphthalene, 3-methylstyrene, acrylonitrile, methacrylonitrile, methylacrylate, methylmethacrylate, vinyl acetate, vinyl chloride, 2-methyl-5-vinylpyridine, 2-vinylpyridine, and the like.

Diluents suitable for use in the polymerization process and subsequently removed in the separation process are hydrocarbons which are substantially inert and non-detrimental to the polymerization reaction and include aromatics, such as benzene, toluene, xylene, ethylbenzene and mixtures thereof; straight and branched paraffins which contain up to and including 12 carbon atoms per molecule including normal pentane, isopentane, normal hexane, isohexane, 2,2,4-trimethylpentane (isooctane), normal decane, mixtures of these paraffinic hydrocarbons and the like; aromatic halides such as chloronaphthalene and the like; and cyclo paraffins, such as cyclohexane and methylcyclohexane. Furthermore, mixtures of any of the aforementioned compounds can be employed as diluents.

Figure 1:
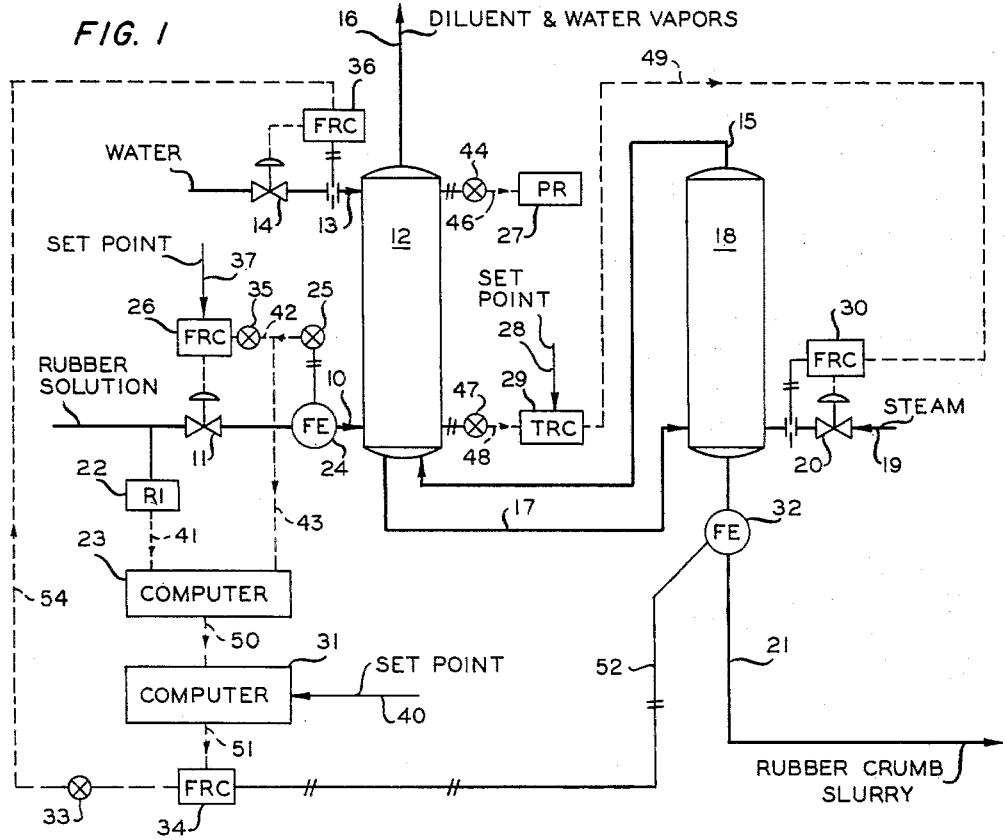
FIGURE 1 is a schematic flow diagram illustrating the separation process with the control system of my invention.

Referring to FIGURE 1, a solution of rubbery polymer comprising a rubbery polymer and a diluent is passed via conduit means 10 and control valve 11 to a separation (stripper) vessel 12. Water is passed to separation vessel 12 via conduit means 13 and control valve 14. Steam and diluent vapors, from a source hereinafter described, are transmitted via conduit means 15 to separation vessel 12. Temperature and pressure of separation (stripping zone) vessel 12 is maintained in the range of about 150–225° F. and in the range of about 5–25 p.s.i.a., respectively, with the specific temperature and pressure employed dependent upon the specific diluent and rubbery polymer present in the feed stream.

An overhead vaporous stream is withdrawn from the upper region of separation vessel 12 via conduit means 16, said vapor stream comprising diluent and water vapors at, preferably, a constant volume ratio of steam to diluent. A slurry comprising water and rubber is withdrawn from the lower region of separation vessel 12 via conduit means 17 and passed to a separation vessel 18. Preferably, a dispersant such as a sodium salt of a copolymer of maleic anhydride and diisobutylene, disclosed in copending application No. 63,888, now Patent No. 3,190,868, by J. Mitacek, C. Mariz, and E. Pennington, filed October 20, 1960, or the product sold by Rohm and Haas under the trademark Tamol 731, is introduced into separation vessel 12 with the water via conduit means 13. The dispersant acts to disperse the rubber in separation vessel 12, thereby aiding in the removal of said rubber as a slurry via conduit means 17.

Within separation vessel 18, the slurry is contacted with steam passed to separation vessel 18 via conduit means 19 and control valve 20. A vaporous overhead stream comprising diluent and steam is withdrawn from the upper region of separation vessel 18 and passed via conduit means 15, as heretofore described, to separation vessel 12. Rubber crumb slurried in water is withdrawn from separation vessel 18 and passed via conduit means 21 to further processing steps.

Figure 4:
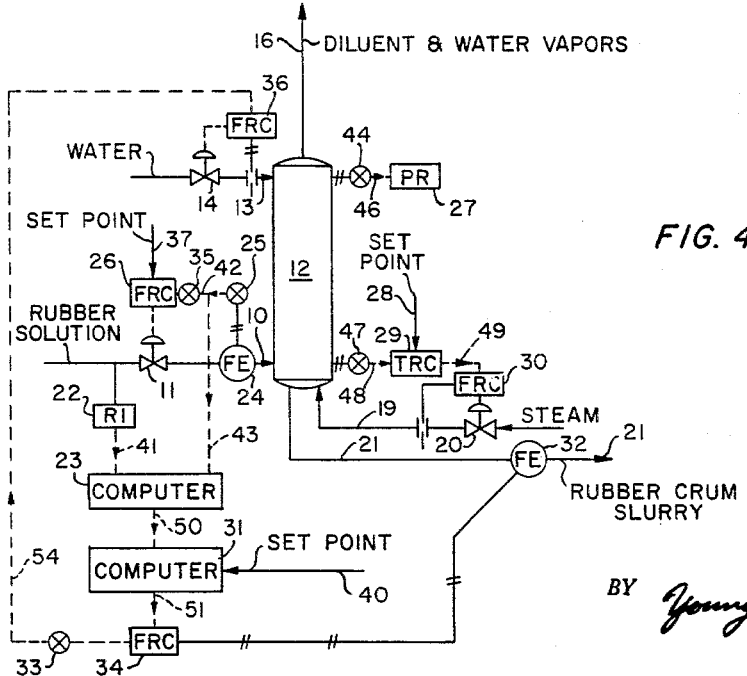

Although the preferred embodiment of separation of diluent and rubber by employing two separation vessels has herein been illustrated, it is within the scope of this invention to perform the separation or stripping operation in one separation vessel or to employ three or more separation vessels in order to efficiently separate the diluent and polymerized rubber. FIGURE 4 shows the embodiment of the invention shown in FIGURE 1 wherein the separation or stripping operation is carried out in one separation vessel. FIGURE 4 corresponds generally to FIGURE 1 except the separation vessel 18 has been combined with separation vessel 12, thus eliminating lines 15 and 17. In all other respects, the numerals as well as the elements of the drawing correspond to those of FIGURE 1.

The flow of materials through the separation system having been discussed above, the control features of the invention will now be described in more detail. The concentration of the rubber in the solution passed to separation vessel 12 via conduit means 10 is determined by passing a sample portion of the rubber solution to a means 22 of determining the refractive index of said solution and transmitting a signal via conduit means 41 representative of the weight percent of rubber to a computer 23. It is within the scope of this invention to employ other means of analyzing for the concentration of rubber such as measuring the density with an Accuray density measurement system produced by Industrial Nucleonics Corporation, Columbus, Ohio, and described in Industrial Nucleonics Bulletin N1–158. The flow of rubber solution through conduit 10 is sensed by flow element 24 which with frequency converter 25 produces a signal representative of the mass (gravimetric) rate of flow of rubber solution in conduit means 10. A conventional instrument capable of sensing said rate of flow is a positive displacement meter Model AB75B distributed by A. O. Smith. This flow signal is passed to flow-recorder-controller 26 via conduit means 42 and E.M.F.-to-pneumatic transducer 35 operatively connected to control valve 11 and conduit 10. As illustrated in FIGURE 1, the rate of flow of rubber solution to column 12 is maintained at a desired control level by means of a set point 37. A signal representative of the flow rate of rubber solution in pounds per unit time is also transmitted by converter 25 to computer 23 via conduit means 43.

The efficient separation of the diluent from the rubber is effected by maintaining the volume ratio of water vapor to diluent passing overhead in conduit means 16 from separation vessel 12 substantially constant at a predetermined ratio. This is accomplished by measuring the pressure in the upper region of separation vessel 12 and passing a signal representative of said pressure measurement to a pressure-recorder 27 via transducer 44 and conduit means 46. The correlation between temperature and pressure necessary in order to maintain the overhead effluent ratio constant having been predetermined, a set point 28 representative of a desired temperature responsive to the pressure measurement is inserted into temperature-recorder-controller 29. The temperature of separation vessel 12 is measured and a signal representative of said temperature measurement is transmitted by an E.M.F.-to-pneumatic transducer 47 and conduit means 48 to temperature-recorder-controller 29. Temperature-recorder-controller 29 transmits a reset signal to flow-recorder-controller 30 which via conduit means 49 in turn opens and closes valve 20 in response to the measured flow rate of steam in conduit 19. Thus the diluent to steam ratio in conduit 16 is controlled by the rate of steam flow in conduit 19.

Computer 23 is an instrument capable of multiplying a signal received from refractive index zone 22 by a signal received from flow element 24 via frequency converter 25 to produce a signal representative of the weight of rubber per unit time present in the stream flowing through conduit 10. This signal is transmitted by computer 23 to computer 31 via conduit means 50. A set point signal 40 representative of the desired concentration of rubber in the effluent slurry flowing through conduit 21 is transmitted to computer 31. Computer 31 is an instrument capable of dividing the signal received from computer 23 by the set point signal 40 to produce a signal representative of the weight of rubber crumb slurry per unit time required in conduit 21 in order to produce a rubber crumb slurry of the desired composition. Computers 23 and 31 can be conventional small analog computers capable of performing the functions herein attributed to them. An analog computer capable of performing these operations is Model TR–10 manufactured by Electronic Associates, Long Branch, New Jersey.

Computer 31 transmits a signal representative of the required weight of slurry per unit time to a conventional flow-recorder-controller 34 via conduit means 51 as a reset signal. The flow of slurry through conduit means 21 is sensed by flow element 32 which produces an electrical signal representative of the mass (gravimetric) rate of flow of slurry in conduit 21. An instrument capable of sensing the mass rate of flow of the slurry to conduit 21 is an electromagnetic flow meter manufactured by Foxboro Company and described in Bulletin 20–14D. This flow signal representative of the mass rate of flow through conduit 21 is transmitted to flow-recorder-controller 34 via conduit means 52.

Flow-recorder-controller 34 transmits a signal via E.M.F.-to-pneumatic transducer 33 and conduit means 54 as a reset signal to flow-recorder-controller 36, said reset signal representative of the rate of flow of water to separation vessel 12 required in order to produce a rubber crumb slurry of the desired composition. Flow-recorder-controller 36 opens or closes valve 14 responsive to the reset signal received from FRC–34.

Although the employment of two computers has herein been illustrated, it is within the scope of this invention to perform the functions attributed to computers 23 and 31 by a single computer.

Figure 2:
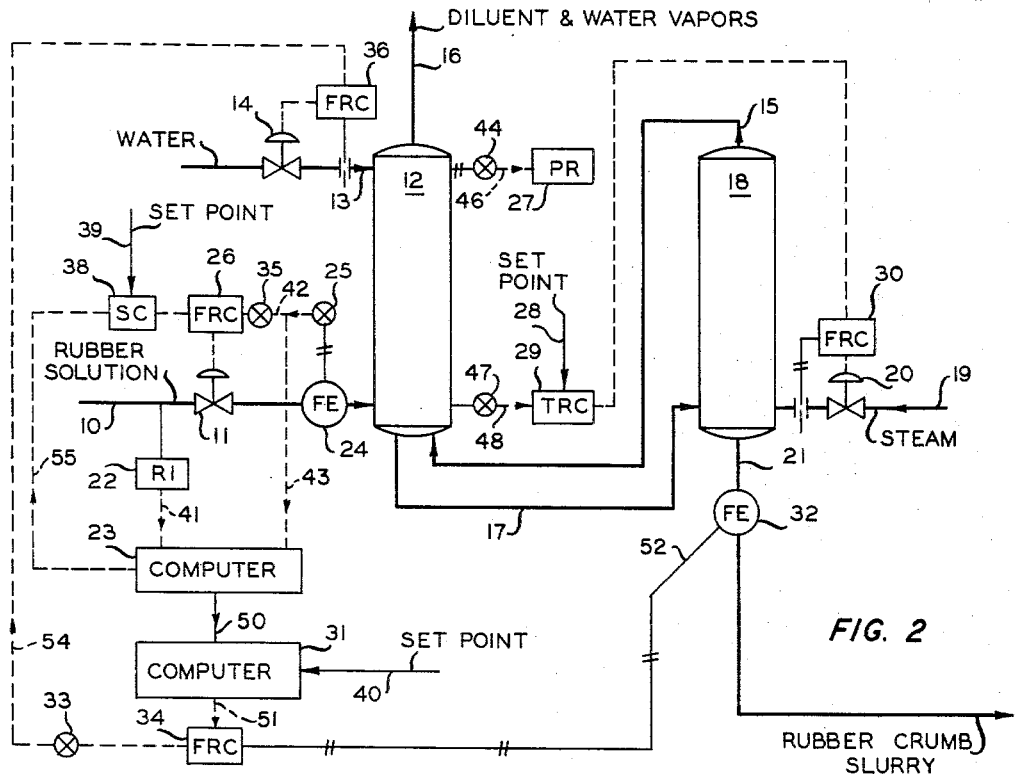
FIGURE 2 is a schematic flow diagram illustrating the separation process for a second embodiment of the inventive control system.

Referring to FIGURE 2, therein is illustrated a second embodiment of the inventive control system. The control features described in connection with FIGURE 1 that perform the same functions in the control system of FIGURE 2 will not be further discussed. As illustrated, computer 23 transmits a signal to computer 31 representative of the weight per unit time of the rubber flowing in conduit 10. This signal is also transmitted by computer 23 to a conventional solids controller 38 via conduit means 55. Solids controller 38 compares this input signal with a set point signal 39 representative of the desired (control) weight per unit time of rubber to be separated by the separation process and transmits a signal as a reset signal to flow-recorder-controller 26. This reset signal is representative of the weight of flow of rubber solution required in conduit 10 to maintain the weight per unit time of rubber flowing through conduits 10 and 21 substantially constant.

Figure 3:
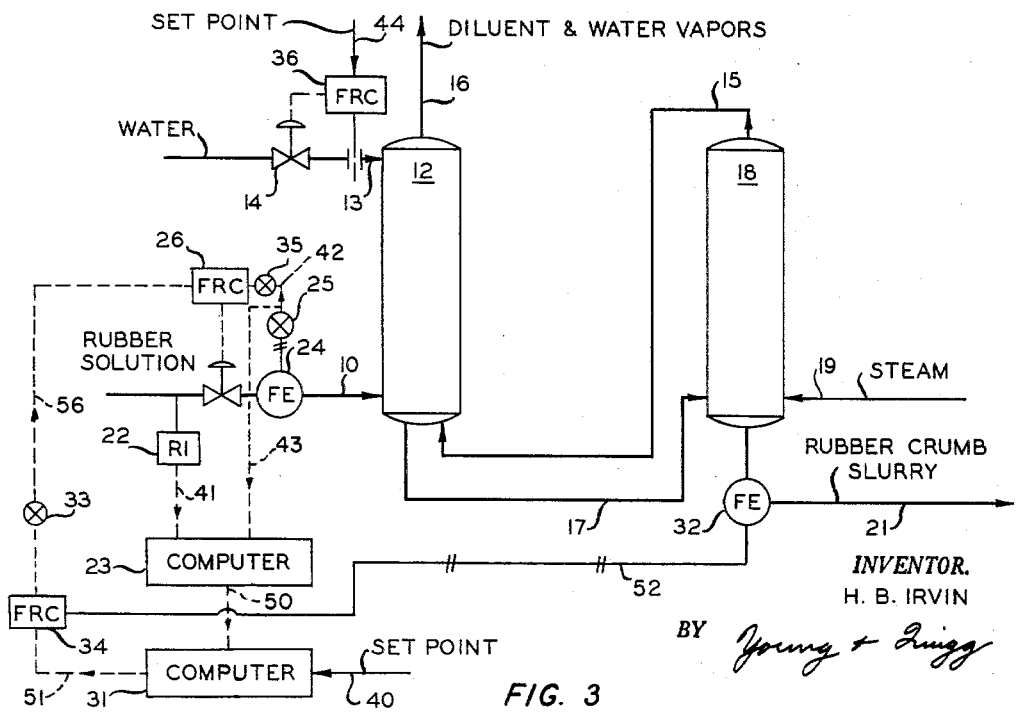
FIGURE 3 is a schematic flow diagram illustrating the separation process for a third embodiment of the inventive control system.

It is within the scope of this invention to maintain the rate of flow of water through conduit 13 substantially constant and to manipulate the rate of rubber solution through conduit 10 so as to produce a rubber crumb slurry effluent stream having a controlled composition. This control method is illustrated in FIGURE 3 wherein flow-recorder-controller 34 transmits a signal representative of the rubber solution flow rate required to produce a rubber crumb slurry of the desired control composition. This signal is transmitted as a reset signal to flow-recorder-controller 26 via E.M.F.-to-pneumatic transducer 33 and conduit means 56, flow-recorder-controller 26 manipulating the rate of flow of rubber solution through conduit 10 responsive to said reset signal and the mass rate-of-flow measurement signal transmitted by flow element 24. The remainder of the control system functions as described in connection with FIGURES 1 and 2.

The following example is presented as illustrating the effectiveness of the inventive control system.

EXAMPLE

A rubber solution containing 15.0 weight percent of rubbery polymer is passed through conduit 10 of FIGURE 1 to separation vessel 12. The temperature and pressure of separation vessel 12 is maintained at 200° F. and at 15 p.s.i.a., respectively. The temperature and pressure of separation vessel 18 is maintained at 220° F. and 18 p.s.i.a., respectively. Rubber crumb slurry containing 5.7 weight percent rubber is withdrawn from separation zone 18 by means of conduit 21. The composition of the streams flowing through the conduits of FIGURE 1 are as illustrated in Table I. The figures listed in Table I are in pounds per stream day.

*Table I*

CONSTITUENTS

|  | Butadiene | Toluene | Water | Steam | Butadiene Polymer | Dispersant |
|---|---|---|---|---|---|---|
| Conduit 10 | 206 | 822,250 |  |  | 138,942 |  |
| Conduit 13 |  |  | 2,128,548 |  |  | 144 |
| Conduit 16 | 206 | 820,861 |  |  | 533,027 |  |
| Conduit 17 |  | 14,444 | 2,393,090 |  | 138,942 | 144 |
| Conduit 15 |  | 13,055 |  | 797,137 |  |  |
| Conduit 21 |  | 1,359 | 2,411,953 |  | 138,942 | 144 |
| Conduit 19 |  |  |  | 816,000 |  |  |

As will be evident to those skilled in the art, various modifications of this invention can be made, or followed, in the light of the foregoing disclosure and discussion without departing from the spirit or scope thereof.

I claim:

1. In a stripping process which comprises contacting a liquid hydrocarbon containing a constituent of interest with water and a stripping vapor in a contact zone, withdrawing from said contact zone water containing said constituent of interest, and withdrawing from said contact zone a vaporous mixture comprising hydrocarbon vapors and said stripping vapor passed to said contact zone; a method of control which comprises measuring at least a property of said liquid hydrocarbon representative of the concentration of said constituent of interest contained to said liquid hydrocarbon passing to said contact zone, passing a first signal representative of said measurement to a computing zone, measuring a property of said liquid hydrocarbon containing said constituent of interest representative of the mass rate of flow of said liquid hydrocarbon to said contact zone, passing a second signal representative of said liquid hydrocarbon mass rate of flow measurement to said computing zone, passing a third signal from said computing zone to a control zone representative of the required withdrawal mass rate of flow of said water containing said constituent of interest withdrawn from said contact zone, passing a fourth signal to said control zone representative of the mass rate of flow of said water containing said constituent of interest withdrawn from said contact zone, and passing a fifth signal from said control zone to a means for manipulating a process variable of said stripping process said fifth signal being responsive to said third and fourth signals, said process variable selected from the group consisting of the rate of flow of said liquid hydrocarbon to said contact zone and the rate of flow of said water to said contact zones.

2. The control method of claim 1 wherein said liquid hydrocarbon comprises a diluent solution of rubber, and said stripping vapor comprises steam.

3. In a stripping process which comprises passing a liquid hydrocarbon containing a constituent of interest as a feed solution to a contact zone, passing water to said contact zone and therein contacting said feed solution, passing a stripping vapor to said contact zone and therein contacting said feed solution, withdrawing from said contact zone a vaporous mixture comprising hydrocarbon vapors and stripping vapors, and withdrawing from said contact zone water containing said constituent of interest; a method of control which comprises determining the mass rate of flow of said constituent of interest in said liquid hydrocarbon passed to said contact zone, measuring a property of said water containing said constituent of interest withdrawn from said contact zone representative of the mass rate of flow of said water containing said constituent of interest withdrawn from said contact zone, and manipulating a variable of said stripping process responsive to said determination and said measurement, said variable selected from the group consisting of the rate of flow of said liquid hydrocarbon and its contained constituent of interest to said contact zone and the rate of flow of said water to said contact zone.

4. In a stripping process which comprises passing a hydrocarbon diluent solution of rubber to a contact zone, passing water to said contact zone and therein contacting said hydrocarbon diluent solution, passing steam to said contact zone and therein contacting said hydrocarbon diluent solution, withdrawing from said contact zone water containing said rubber, and withdrawing from said contact zone an overhead vaporous hydrocarbon diluent and steam stream; a method of control which comprises measuring a property of said hydrocarbon diluent solution of rubber representative of the weight concentration of rubber in said solution, passing a first signal representative of said concentration measurement to a computing zone, measuring a property of said hydrocarbon diluent solution of rubber representative of the mass rate of flow of said solution to said contact zone, passing a second signal to said computing zone representative of said mass rate of flow of said solution of rubber to said contact zone, passing a third signal from said computing zone to a control zone representative of the required mass rate of withdrawal of said water containing rubber withdrawn from said contact zone, measuring a property of said water containing rubber withdrawn from said contact zone representative of the mass rate of flow of said water containing rubber, passing a fourth signal to said control zone representative of said measurement of said mass rate of flow of water containing rubber withdrawn from said contact zone, passing a fifth signal from said control zone to a means of manipulating the rate of flow of said water to said contact zone responsive to said fifth signal, said fifth signal transmitted by said control zone responsive to said third and fourth signals, and maintaining the volume rate of flow of said solution of rubber to said contact zone substantially constant.

5. In a stripping process which comprises passing a hydrocarbon diluent solution of rubber to the lower region of a first contact zone, passing water to the upper region of said first contact zone and therein contacting said hydrocarbon diluent solution, passing a slurry comprising water, said hdyrocarbon diluent and said rubber from the lower region of said first contact zone to the lower region of a second contact zone, withdrawing from said first contact zone an overhead vaporous hydrocarbon and steam stream, passing steam to the lower region of said second contact zone and therein contacting said slurry, passing an overhead vaporous hydrocarbon and steam stream from said second contact zone to the lower region of said first contact zone and therein contacting said hydrocarbon diluent solution, and withdrawing from said second contact zone water containing said rubber; a method of control which comprises measuring a property of said hydrocarbon diluent solution of rubber representative of the weight concentration of said rubber in said solution, passing a first signal representative of said weight concentration of said rubber in said solution to a computing zone, measuring a property of said hydrocarbon diluent solution of rubber representative of the mass rate of flow of said solution to said first contact zone, passing a second signal representative of said mass rate of flow measurement to said computing zone, passing a third signal responsive to said first and second signals from said computing zone to a control zone representative of the required withdrawal mass rate of flow of said water containing said rubber from said second contact zone, measuring a property of said water containing rubber withdrawn from said second contact zone representative of the mass rate of flow of said water containing said rubber, passing a fourth signal representative of said water containing rubber mass rate of flow measurement to said control zone, and manipulating a process variable of said stripping process responsive to a fifth signal transmitted by said control zone, said fifth signal responsive to said third and fourth signals and said process variable selected from the group consisting of the rate of flow of water to said first contact zone and the rate of flow of solution of rubber to said first contact zone.

6. Apparatus comprising, in combination, a first stripping vessel, a second stripping vessel, first conduit inlet means communicating with the lower region of said first stripping vessel, second conduit inlet means communicating with the upper region of said first stripping vessel, third conduit means communicating between the lower region of said first stripping vessel and the upper region of said second stripping vessel, fourth conduit means communicating between the lower region of said first stripping vessel and the lower region of said second stripping vessel, fifth conduit outlet means communicating with the upper region of said first stripping vessel, sixth conduit outlet means communicating with the lower region of said second stripping vessel, seventh conduit inlet means communicating with the lower region of said second stripping vessel, a computing means, means for measuring a property of a fluid flowing through said first conduit inlet means representative of the weight concentration of a constituent of interest contained in said fluid, means for transmitting a first signal representative of said measurement of said weight concentration of said constituent of interest in said fluid flowing through said first conduit inlet means to said computing means, means for measuring a property of said fluid flowing through said first conduit means representative of the mass rate of flow of said fluid through said first conduit means, means for transmitting to said computing means a second signal representative of said mass rate of fluid flow through said first conduit means, a control means, means for transmitting a third signal responsive to said first and second signals from said computing means to said control means, said third signal representative of the required mass rate of fluid flow through said sixth conduit means, means for measuring a property of said fluid flow through said sixth conduit outlet means representative of the mass rate of fluid flow through said sixth conduit outlet means, means for transmitting a fourth signal representative of the mass rate of fluid flow through said sixth conduit outlet means to said control means, means for manipulating a process variable selected from the group consisting of the volume rate of fluid flow through said first conduit means and the volume rate of fluid flow through said second conduit means, and means for transmitting a sixth signal from said control means to said means for manipulating the process variable, said sixth signal responsive to said third and fourth signals.

7. The apparatus of claim 6 wherein said process variable comprises the volume rate of fluid flow through said second conduit means, and to include means for maintaining the volume rate of fluid flow through said first conduit means substantially constant.

8. The apparatus of claim 6 wherein said process variable comprises the volume rate of fluid flow through said first conduit means, and to include means for maintaining the rate of volume of fluid flow through said second conduit means substantially constant.

9. In a stripping process which comprises passing a liquid hydrocarbon containing a constituent of interest as a feed solution to the lower region of a first contact zone, passing water to the upper region of said first contact zone and therein contacting said feed solution, passing a first vaporous mixture comprising steam and hydrocarbon vapors from a source hereinafter described to said first contact zone and therein contacting said feed solution, withdrawing from the upper region of said first contact zone a vaporous mixture comprising steam and hydrocarbon vapors, passing a mixture comprising water, said hydrocarbon and said constituent of interest from the lower region of said first contact zone to the lower region of a second contact zone, passing steam to the lower region of said second contact zone and therein contacting said mixture, passing said first vaporous mixture from the upper region of said second contact zone to the lower region of said first contact zone and therein contacting said feed solution, and withdrawing water containing said constituent of interest from said second contact zone; a method of control which comprises determining the mass rate of flow of said constituent of interest in said liquid hydrocarbon passed to said first contact zone, measuring a property of said water containing said constituent of interest withdrawn from said second contact zone representative of the mass rate of flow of said water containing said constituent of interest withdrawn from said second contact zone, and manipulating a process variable of said first contact zone responsive to said determination and said measurement, said variable selected from the group consisting of the volume rate of flow of said liquid hydrocarbon to said first contact zone, and the volume rate of flow of said water to said first contact zone.

10. In a stripping process which comprises passing a feed hydrocarbon diluent solution of rubber to a contact zone, passing water to said contact zone and therein contacting said hydrocarbon diluent solution, passing steam to said contact zone and therein contacting said hydrocarbon diluent solution, withdrawing from said contact zone water containing said rubber, and withdrawing from said contact zone an overhead vaporous hydrocarbon diluent and steam stream; a method of control which comprises measuring a property of said feed hydrocarbon diluent solution of rubber representative of the weight concentration of rubber in said solution, passing a first signal representative of said concentration measurement to a computing zone, measuring a property of said hydrocarbon diluent solution of rubber representative of the mass rate of flow of said solution to said contact zone, passing a second signal to said computing zone representative of said mass rate of flow of said solution of rubber to said contact zone, passing a third signal from said computing zone to a control zone representative of the required mass rate of withdrawal of said water containing rubber withdrawn from said contact zone, measuring a property of said water containing rubber withdrawn from said contact zone representative of the mass rate of flow of said water containing rubber, passing a fourth signal to said control zone representative of said measurement of said mass rate of flow of water containing rubber withdrawn from said contact zone, passing a fifth signal from said control zone to a means for manipulating the volume rate of flow of said solution to said contact zone responsive to said fifth signal, said fifth signal transmitted by said control zone responsive to said third and fourth signals, and maintaining the volume rate of flow of said water to said contact zone substantially constant.

References Cited by the Examiner

UNITED STATES PATENTS

| | | | |
|---|---|---|---|
| 2,881,235 | 4/1959 | Pool. | |
| 2,900,334 | 8/1959 | Miller | 196—132 X |
| 3,004,089 | 10/1961 | Hutto | 196—132 X |
| 3,042,637 | 7/1962 | Crouch | 260—17.5 |

NORMAN YUDKOFF, *Primary Examiner.*

ROBERT F. BURNETT, GEORGE D. MITCHELL, *Examiners.*

J. SOFER, *Assistant Examiner.*